US007959774B2

(12) United States Patent
Nara et al.

(10) Patent No.: US 7,959,774 B2
(45) Date of Patent: Jun. 14, 2011

(54) CATHODE FOR HYDROGEN GENERATION

(75) Inventors: Miwako Nara, Fujisawa (JP); Tomohisa Suzuki, Fujisawa (JP); Masashi Tanaka, Fujisawa (JP); Yoshinori Nishiki, Fujisawa (JP)

(73) Assignee: Permelec Electrode Ltd., Kanagawa (JP)

( * ) Notice: Subject to any disclaimer, the term of this patent is extended or adjusted under 35 U.S.C. 154(b) by 303 days.

(21) Appl. No.: 12/398,234

(22) Filed: Mar. 5, 2009

(65) Prior Publication Data

US 2009/0223815 A1    Sep. 10, 2009

(30) Foreign Application Priority Data

Mar. 7, 2008   (JP) ................................. 2008-057968

(51) Int. Cl.
*C25B 11/06* (2006.01)
*C25B 11/08* (2006.01)

(52) U.S. Cl. ........... 204/290.1; 204/290.01; 204/290.14; 204/291; 204/292; 204/293; 204/284

(58) Field of Classification Search .................. 204/291, 204/292, 293, 290.01, 290.1, 290.14, 284; 429/524, 528, 532, 534
See application file for complete search history.

(56) References Cited

U.S. PATENT DOCUMENTS

| 6,312,571 | B1 | 11/2001 | Nara et al. |
| 7,232,509 | B2 * | 6/2007 | Nara et al. ............... 204/290.14 |
| 2004/0151896 | A1 | 8/2004 | Houda et al. |
| 2008/0230380 | A1 * | 9/2008 | Ohsaka et al. ........... 204/290.09 |
| 2009/0223815 | A1 * | 9/2009 | Nara et al. ..................... 204/292 |

FOREIGN PATENT DOCUMENTS

| DE | 10007448 A1 | 8/2000 |
| JP | 6-33481 B2 | 5/1994 |
| JP | 6-33492 B2 | 5/1994 |
| JP | 2000-239882 A | 9/2000 |
| JP | 2000-277966 A | 10/2000 |
| JP | 2006-118022 A | 5/2006 |
| JP | 2006-118023 A | 5/2006 |
| JP | 2006-299395 A | 11/2006 |

* cited by examiner

*Primary Examiner* — Bruce F Bell
(74) *Attorney, Agent, or Firm* — Sughrue Mion, PLLC

(57) ABSTRACT

The present invention provides a cathode for hydrogen generation comprising a cathode substrate having provided thereon a catalytic layer, wherein the catalytic layer contains at least three components of platinum, cerium and lanthanum in amounts of 50 to 98 mol %, 1 to 49 mol % and 1 to 49 mol %, respectively, in the form of metal, metal oxide or metal hydroxide.

4 Claims, No Drawings

CATHODE FOR HYDROGEN GENERATION

FIELD OF THE INVENTION

The present invention relates to a cathode used in industrial electrolysis.

BACKGROUND OF THE INVENTION

Sodium hydroxide and chlorine which are important as industrial raw materials have been mainly produced by a brine electrolysis process.

The electrolysis process has made the shift to an ion-exchange membrane process using an ion-exchange membrane as a diaphragm and using an activated cathode having a low overvoltage, via a mercury process using a mercury cathode and a diaphragm process using an asbestos diaphragm and a soft-iron cathode. During this interval, the electric power consumption rate required for the production of 1 ton of caustic soda has decreased to 2,000 kWh.

The activated cathode is obtained, for example, by using the following methods or materials.

That is, the method includes a method of obtaining an activated electrode by dispersing a ruthenium oxide powder in a Ni plating bath and carrying out composite plating, a method of obtaining an activated electrode by NiO plating containing a second component such as S or Sn, and a method of obtaining an activated electrode by NiO plasma splaying or Pt—Ru immersion plating, and the material includes Raney nickel, a Ni—Mo alloy and a hydrogen storing alloy for imparting resistance to reverse current (H. Wendt, *Electrochemical Hydrogen Technologies*, pp. 15-62, 990, U.S. Pat. No. 4,801,368, *J. Electrochem. Soc.*, 137, 1419 (1993), *Modern Chlor-Alkali Technology*, vol. 3, 1986).

In Japanese Patent Nos. 1,911,015 and 1,911,016, it is reported that a mixed catalyst of cerium and a noble metal has resistance to iron contamination. Recently, in the ion-exchange membrane electrolytic process, electrolysis cells which can increase current density for an increase in production capacity and a decrease in investment cost have been devised, and the load of a high current has become possible by development of low-resistant membranes.

DSA as an anode has a running record up to 200 to 300 A/dm$^2$ in the mercury process. Although there is no record yet for the life and performance of a cathode in the ion-exchange membrane process, requests for improvement as described below have been made.

That is, it has been required that the overvoltage is low, that the cathode does not damage a membrane when it comes into contact with the membrane, and that the contamination due to metal ions and the like from the cathode is small.

When these improvements are not cried out, it becomes difficult to use the cathode which has hitherto been used (having large concaves and convexes on a surface thereof and having a catalytic layer with low mechanical strength. In order to realize a new process, the development of an activated cathode having high performance and sufficient stability even under the above-mentioned electrolysis conditions is also indispensable.

In the brine electrolysis process using an activated cathode, which has been most generally conducted at present, the cathode is arranged in contact with a cation-exchange membrane on the cathode side thereof or with a gap of 3 mm or less. When water reacts in a catalytic layer to form sodium hydroxide, an anode reaction and a cathode reaction are each as shown below, and the theoretical decomposition voltage thereof is 2.19 V.

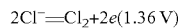

However, when the conventional activated cathode is used for running at high current density, it involves several significant problems as follows.

(1) Associated with deterioration of the electrode, a substrate (nickel, iron and carbon components) is partially dissolved and comes away to move to a cathode solution, a membrane or an anode chamber, which causes a decrease in product quality and deterioration of electrolytic performance.

(2) The overvoltage increases with an increase in current density, resulting in a decrease in energy efficiency.

(3) The bubble distribution in an electrolyzer increases with an increase in current density to cause the occurrence of distribution in the concentration of sodium hydroxide formed, so that the solution resistance loss of the cathode solution increases.

(4) When the operating conditions become severe, the elution of impurities (such as sulfur and iron) from cell-constituting materials increases to contaminate the electrode.

Further, the arrangement of the cathode in close contact with the ion-exchange membrane (zero gap) is desirable because this should make the voltage lower. However, there is a concern that the membrane may be mechanically broken by the cathode having a roughened surface shape. Hence, there has been a problem in the use of the conventional cathode at high current density under the zero gap conditions.

A cathode using a noble metal as the catalyst has also hitherto been proposed, and is promising in its performance. However, it has a price problem, and the amount thereof used should be necessarily reduced. In this case, the catalytic layer becomes thin, so that the substrate is easily dissolved and comes away. Accordingly, improvement thereof has also been desired.

JP-A-2000-277966 discloses a method for producing a cathode comprising ruthenium and cerium by using a coating solution to which oxalic acid is added. JP-A-2006-299395 discloses a method for producing a cathode comprising three components of ruthenium, cerium and niobium. JP-A-2006-118022 and JP-A-2006-118023 disclose a method for producing a cathode comprising an alloy of platinum and an iron group element, copper or silver.

Patent Document 1: JP-A-2000-239882

SUMMARY OF THE INVENTION

Further, patent document 1 discloses a cathode using a catalyst comprising platinum and cerium. As described above, a cathode which is excellent in electrolytic characteristics, stably runs for a long period of time and is low in price has been increasingly needed as the cathode for brine electrolysis.

An object of the invention is to solve the problems of the conventional art described above and to provide an activated cathode which is also usable either in an electrolysis cell at high current density or in a zero gap type cell and is inexpensive.

Other objects and effects of the present invention will become apparent from the following description.

The invention provides a cathode for hydrogen generation comprising a cathode substrate having provided thereon a catalytic layer, wherein the catalytic layer contains at least three components of platinum, cerium and lanthanum in amounts of 50 to 98 mol %, 1 to 49 mol % and 1 to 49 mol %, respectively, in the form of metal, metal oxide or metal hydroxide; and also provides a cathode for hydrogen generation as described above, wherein the catalytic layer further contains a platinum-group metal other than platinum in an amount of 1 to 49 mol % in the form of metal, metal oxide or metal hydroxide state.

DETAILED DESCRIPTION OF THE INVENTION

The invention will be described in detail below.

The present inventors have found that mixing of another rare earth (lanthanum) with a conventional rare earth (cerium) makes it possible to increase stability of the rare-earth components, while keeping conventional catalytic activity, thereby obtaining a cathode which keeps high stability even in a long-term use.

Next, the constitution of the cathode of the invention and a method for producing the same will be described.

In terms of electric conductivity and chemical stability, the material of the cathode substrate is preferably a stainless steel-based, titanium-based, nickel-based or carbon-based material, and the cathode substrate preferably has a thickness of 0.05 to 5 mm and a porosity of 10 to 95%.

Then, the cathode substrate will be described taking nickel as an example.

In order to increase the adhesion force with respect to the catalytic layer, surface roughening treatment is preferably conducted. Methods thereof include conventional blast treatment of spraying a powder, etching using a soluble acid, plasma spraying and the like. In order to remove contamination particles such as metals or organic materials on the surface of the cathode substrate, chemical etching treatment can also be conducted. The consumption of the nickel substrate is preferably from 30 to 400 g/m$^2$, and the cathode after surface roughening has a smooth structure usually having concaves and convexes of 0.01 mm or less.

In the invention, an intermediate layer of an oxide may be formed before the formation of the catalytic layer. As a method for forming the intermediate layer, oxygen in the air and nickel react with each other only by heat treatment of the substrate, thereby being able to form $Ni_{(1-x)}O$. The oxide has oxygen defects although depending on production conditions, so that it generally has p-type semiconductivity. The heat treatment temperature is from 350 to 550° C., and the heat treatment time (baking time) is preferably from 5 to 60 minutes.

When the thickness of the oxide is too thick, the resistance loss increases. On the other hand, when it is thin, only a non-uniform surface layer is obtained. The optimum thickness is from about 0.1 to 1 μm, and it is preferred to uniformly form the intermediate layer on the surface so that the metal of the substrate does not come into contact with an electrolytic solution such as an alkali aqueous solution. A stable oxide can be obtained also by applying a nickel ion-containing solution and conducting heat treatment in a similar manner. It is preferred that the solution used for coating has such a solution composition that corrodes the substrate. As a raw material, there is nickel nitrate, nickel sulfate, nickel chloride or the like. This is added to nitric acid, sulfuric acid or hydrochloric acid to prepare an aqueous solution adjusted to an appropriate concentration, which can be utilized as a coating solution. After coating and drying, thermal decomposition is performed.

Even when the substrate is nickel, it is also possible to provide a conductive oxide intermediate layer comprising another component. For example, there can be used a compound which is stable in alkali and has negligibly small hydrogen generation capability as compared to the catalyst on the surface, such as n-type titanium oxide ($TiO_{2-x}$).

The catalytic layer is formed on the surface of the intermediate layer or directly on the surface of the substrate. The catalytic layer is formed from a homogeneous mixture of platinum, cerium and lanthanun. For the composition of the respective metals, x (the molar fraction of platinum) is from 50 to 98 mol %, y (the molar fraction of cerium) is from 1 to 49 mol %, and z (the molar fraction of lanthanum) is from 1 to 49 mol %. In addition to these, another component may be contained. When the composition of the catalytic layer is adjusted within the above-mentioned range, there are obtained characteristics of lower hydrogen overvoltage, higher stability against short circuit and less consumption in electrolysis, than a cathode having a composition outside the range.

The whole catalytic layer forms a porous structure, and when the above-mentioned intermediate layer is not formed, the electrolytic solution penetrates to accelerate the consumption of the substrate.

Similarly to a metal electrode widely used in brine electrolysis, the catalytic layer is usually formed by applying a salt solution of a catalyst metal to the surface of the substrate, followed by baking. However, it may be formed by preparing the salt solution and performing electroplating, or by performing electroless deposition using a reductant. In particular, when the catalyst is formed by baking, the catalytic component ion-containing solution reacts with the substrate, and a nickel substrate component enters the catalytic layer to dissolve as an oxide or a hydroxide, which exerts an adverse effect on a membrane or an anode. The intermediate layer has a function of preventing this corrosion.

As a raw material compound for the platinum component, there is chloroplatinic acid, diamminedinitroplatinum, bisacetylacetonatoplatinum or the like. An aqueous solution obtained by adding this to nitric acid, hydrochloric acid, water or an alcohol and dissolving to an appropriate concentration can be utilized as the coating solution.

As the platinum-group metal component other than platinum, there is used ruthenium, iridium, rhodium, palladium, osmium or rhenium, and as a raw material compound thereof, there may be used a chloride, a diamminedinitro salt, a bisacetylacetonato compound or the like thereof. An aqueous solution obtained by adding this to nitric acid, hydrochloric acid, water or an alcohol and dissolving to an appropriate concentration can be utilized as the coating solution. The proportions of platinum, cerium and lanthanum and the proportions of platinum, cerium, lanthanum and the platinum-group metal component other than platinum are as described above.

It is preferred that cerium and lanthanum are each present in the catalytic layer as a metal, an oxide thereof or a hydroxide thereof. As the cerium and lanthanum, a misch metal can also be utilized. In this case, the misch metal is required to have a composition in which cerium and lanthanum are within the above-mentioned composition range.

The rare-earth compounds contained in the coating solution include a chloride, a nitric acid compound, a sulfate, an oxide, a hydroxide, an oxalate, an acetate, an acetyl compound and the like.

Drying after coating is performed at 40 to 150° C. for 5 to 20 minutes, and then, thermal decomposition is conducted. The decomposition temperature is from 300 to 650° C., and the baking temperature is preferably from 5 to 60 minutes. It is the best that the total catalyst amount is from about 1 to 15 g/m$^2$, and the optimum thickness of the catalytic layer is from about 0.1 to 10 μm.

When the cathode of the invention is used in brine electrolysis, a fluororesin-based membrane is optimum as the ion-exchange membrane in terms of corrosion resistance. As the anode, there can be used an insoluble titanium electrode containing a noble metal oxide, and it is preferably porous so as to be used in close contact with the membrane. When it is necessary to allow the cathode of the invention to come into close contact with the membrane, it is sufficient only to previously mechanically bond them or to apply pressure to them at the time of electrolysis. The pressure is preferably from 0.1 to 30 kgf/cm$^2$. As electrolysis conditions, the temperature is preferably from 60 to 95° C., and the current density is preferably from 10 to 100 A/dm$^2$.

It is also possible to form the above-mentioned catalytic layer on a cathode having low or decreased activity. In that case, what is necessary is just to perform the above-mentioned coating and baking, after deposits on the surface of the original catalyst serving as a ground are removed by washing.

According to the invention, a cathode comprising a catalytic layer having platinum, cerium and lanthanum is provided as an electrode small in the loss of the catalyst even at high current density and having resistance to contamination due to impurity components of an electrolytic solution, in an ion-exchange membrane process brine electrolysis cell and the like. Mixing of another rare earth (lanthanum) with a conventional rare earth (cerium) makes it possible to increase stability of the rare-earth components, while keeping conventional catalytic activity, thereby obtaining a cathode which keeps high stability even in a long-term use.

Incorporation of cerium and lanthanum causes great effects of generating an interaction between the rare-earth metals to improve stability of the catalyst, preventing poisoning of the catalyst metal caused by electrolysis, not damaging the membrane in contact with the membrane, being small in the loss of the catalyst even when used for a long period of time, and the like. Further, it becomes possible to arrange the cathode in close contact with the ion-exchange membrane, and use of the expensive catalyst can be made minimum because of high stability of the catalyst. Accordingly, investment cost and electric power cost can be decreased.

As the effects of the intermediate layer, the substrate is protected from severe conditions of heat treatment in the production of the catalytic layer, and the catalytic layer is not contaminated with components such as nickel contained in the substrate. The substrate is protected and contamination of the catalytic layer with foreign matter is prevented, while keeping a hydrogen overvoltage decreasing effect by the platinum-group component and the lanthanum component and a poisoning-resistant effect to iron and the like, thereby being able to extend the life of the cathode.

EXAMPLES

The cathode for hydrogen generation according to the invention will be illustrated in greater detail with reference to the following examples and comparative examples, but the invention should not be construed as being limited thereby.

Example 1

A cell having an electrolytic area of 100 cm$^2$ (5 cm in width and 20 cm in height) was used. As a cathode substrate, there was used a nickel mesh (8 mm in long width, 6 mm in short width and 1 mm in thickness) a surface of which was sufficiently roughened with alumina particles (No. 60), and etched with 20 wt % boiled hydrochloric acid.

Using diamminedinitroplatinum, cerium nitrate and lanthanum nitrate as raw materials, a coating solution having a composition shown in Table 1 (x=50, y=30 and z=20) and a concentration of 5 wt % was prepared. The above-mentioned nickel mesh was immersed in the coating solution, and slowly pulled tip. This was dried at 60° C., and then, baked in an electric furnace at 500° C. for 10 minutes. This process was repeated three times in total to prepare a cathode having a final total catalyst amount of 7 g/m$^2$.

Using a DSE porous anode made of titanium as an anode and Nafion 981 (manufactured by E.I. du Pont de Nemours & Co.) as an ion-exchange membrane, an electrolysis cell was assembled in which the above-mentioned cathode and porous anode were allowed to come into close contact with respective sides of the ion-exchange membrane. A saturated brine solution was supplied as an anode solution at a rate of 4 ml per minute, and pure water was supplied to the cathode chamber at a rate of 0.4 ml per minute. It was confirmed by ICP that impurities such as iron were present in a cathode alkali solution in an amount of about 0.5 ppm.

The temperature was adjusted to 90° C., and a current of 50 A was allowed to flow. As a result, the cathode overvoltage was 90 mV. After electrolysis was performed for 10 days while suspending the electrolysis for 1 hour per day, no increase in cathode overvoltage was observed. After the electrolysis for 30 days, the cell was disassembled, and the electrode was analyzed. However, no decrease in catalyst amount was observed, and no deposit to the electrode was also observed.

Example 2

Using the same cathode substrate as in Example 1, a solution in which 5 wt % of titanium tetrachloride was dissolved was applied in an amount of 5 g/m$^2$, followed by heating in an air-atmosphere baking furnace of 550° C. for 20 minutes to form titanium oxide on the surface thereof.

Using chloroplatinic acid, cerium chloride and lanthanum chloride as raw materials, a coating solution having a composition shown in Table 1 (x=50, y=20 and z=30) and a concentration of 5 wt % was prepared. The solution was applied to both surfaces of the above-mentioned nickel mesh with a brush little by little. This was dried at 60° C., and then, baked in an electric furnace at 550° C. for 20 minutes. This process was repeated five times in total. As a result, the final total catalyst amount thereof was 7 g/m$^2$.

A similar cell as in Example 1 was assembled, and electrolysis was performed under the same conditions as in Example 1. As a result, the cathode overvoltage was 85 mV. After the electrolysis was performed for 10 days while suspending the electrolysis for 1 hour per day, no increase in cathode overvoltage was observed. After the electrolysis for 30 days, the cell was disassembled, and the electrode was analyzed. However, no decrease in catalyst amount was observed, and no deposit to the electrode was also observed.

Example 3

Using the same cathode substrate as in Example 1, a solution in which 5 wt % of nickel nitrate was dissolved was applied in an amount of 5 g/m$^2$, followed by heating in an air-atmosphere baking furnace of 550° C. for 20 minutes to form nickel oxide on the surface thereof.

Using bis(acetylacetonato)platinum, tris(acetylactonato)cerium and tris(acetylacetonato)lanthanum as raw materials, a coating solution having a composition shown in Table 1 (x=60, y=35 and z=5) and a concentration of 2 wt % was prepared. The above-mentioned nickel mesh was immersed in the coating solution, and slowly pulled up. This was dried at 60° C., and then, baked in an electric furnace at 450° C. for 30 minutes. This process was repeated five times in total. As a result, the final total catalyst amount thereof was 7 g/m$^2$.

A similar cell as in Example 1 was assembled, and electrolysis was performed under the same conditions as in Example 1. As a result, the cathode overvoltage was 85 mV. After the electrolysis was performed for 10 days while suspending the electrolysis for 1 hour per day, no increase in cathode overvoltage was observed. The cell was disassembled, and then, the electrode was analyzed. However, no deposit was observed. After the electrolysis for 30 days, the cell was disassembled, and the electrode was analyzed. However, no decrease in catalyst amount was observed, and no deposit to the electrode was also observed.

Example 4

Using the same cathode substrate as in Example 1, a solution in which 5 wt % of tetrabutyl titanate was dissolved was applied in an amount of 5 g/m$^2$, followed by heating in an air-atmosphere baking furnace of 500° C. for 20 minutes to form titanium oxide on the surface thereof. Using diamminedinitroplatinum, cerium acetate and lanthanum acetate as raw materials, a coating solution having a composition shown in Table 1 (x=50, y=5 and z=45) and a concentration of 5 wt % was prepared. This solution was applied to both surfaces of the above-mentioned nickel mesh with a brush little by little. This was dried at 60° C., and then, baked in an electric furnace at 500° C. for 20 minutes. This process was repeated five times in total. The final total catalyst amount thereof was 7 g/m².

A similar cell as in Example 1 was assembled, and electrolysis was performed under the same conditions as in Example 1. As a result, the cathode overvoltage was 90 mV. After the electrolysis was performed for 10 days while suspending the electrolysis for 1 hour per day, no increase in cathode overvoltage was observed. The cell was disassembled, and then, the electrode was analyzed. However, no deposit was observed. After the electrolysis for 30 days, the cell was disassembled, and the electrode was analyzed. However, no decrease in catalyst amount was observed, and no deposit to the electrode was also observed.

Example 5

The same cathode substrate as in Example 1 was placed in an air-atmosphere baking furnace of 550° C. for 20 minutes to form nickel oxide on the surface thereof. Using chloroplatinic acid, cerium chloride and lanthanum chloride as raw materials, a coating solution having a composition shown in Table 1 (x=50, y=49 and z=1) and a concentration of 5 wt % was prepared. This solution was applied to both surfaces of the above-mentioned nickel mesh with a brush little by little. This was dried at 60° C., and then, baked in an electric furnace at 500° C. for 10 minutes. This process was repeated five times in total. The final total catalyst amount thereof was 7 g/m².

The same cell as in Example 1 was assembled, and electrolysis was performed under the same conditions as in Example 1. As a result, the cathode overvoltage was 90 mV. After the electrolysis was performed for 10 days while suspending the electrolysis for 1 hour per day, no increase in cathode overvoltage was observed. After the electrolysis for 30 days, the cell was disassembled, and the electrode was analyzed. However, no decrease in catalyst amount was observed, and no deposit to the electrode was also observed.

Example 6

Using the same cathode substrate as in Example 1, a solution in which 6 wt % of titanium tetrachloride was dissolved was applied in an amount of 5 g/m², followed by heating in an air-atmosphere baking furnace of 520° C. for 20 minutes to form titanium oxide on the surface thereof. Using diamminedinitroplatinum and a misch metal as raw materials, a coating solution having a composition shown in Table 1 (x=50, y=35 and z=15) and a concentration of 5 wt % was prepared. This solution was applied to both surfaces of the above-mentioned nickel mesh with a brush little by little. This was dried at 60° C., and then, baked in an electric furnace at 550° C. for 20 minutes. This process was repeated five times in total. As a result, the final total catalyst amount thereof was 7 g/m².

A similar cell as in Example 1 was assembled, and electrolysis was performed under the same conditions as in Example 1. As a result, the cathode overvoltage was 90 mV. After the electrolysis was performed for 10 days while suspending the electrolysis for 1 hour per day, no increase in cathode overvoltage was observed. After the electrolysis for 30 days, the cell was disassembled, and the electrode was analyzed. However, no decrease in catalyst amount was observed, and no deposit to the electrode was also observed.

Example 7

The same cathode substrate as in Example 1 was placed in an air-atmosphere baking furnace of 500° C. for 30 minutes to form nickel oxide on a surface thereof. Using diamminedinitroplatinum, cerium nitrate, lanthanum nitrate and ruthenium nitrate as raw materials, a coating solution having a composition shown in Table 1 (x=60, y=20, z=10 and ruthenium=10) and a concentration of 3 wt % was prepared. The above-mentioned nickel mesh was immersed in the coating solution, and slowly pulled up. This was dried at 60° C., and then, baked in an electric furnace at 550° C. for 15 minutes. This process was repeated seven times in total. The final total catalyst amount thereof was 7 g/m².

A similar cell as in Example 1 was assembled, and electrolysis was performed under the same conditions as in Example 1. As a result, the cathode overvoltage was 85 mV. After the electrolysis was performed for 10 days while suspending the electrolysis for 1 hour per day, no increase in cathode overvoltage was observed. The cell was disassembled, and then, the electrode was analyzed. However, no deposit was observed. After the electrolysis for 30 days, the cell was disassembled, and the electrode was analyzed. However, no decrease in catalyst amount was observed, and no deposit to the electrode was also observed.

Comparative Example 1

An electrode was prepared in the same manner as in Example 1 with the exception that a mixed layer of platinum and cerium (x=50, y=50 and z=0) was used as the catalytic layer. A similar cell as in Example 1 was assembled, and electrolysis was performed under the same conditions as in Example 1. As a result, the cathode overvoltage was 90 mV. After the electrolysis was performed for 10 days while suspending the electrolysis for 1 hour per day, no increase in cathode overvoltage was observed. After the electrolysis for 30 days, the cell was disassembled, and the electrode was analyzed. As a result, cerium decreased by 20% from the initial amount. Further, no deposit to the electrode was observed.

Comparative Example 2

An electrode was prepared in the same manner as in Example 2 with the exception that the composition of the catalytic layer was changed to X=40, y=30 and z=30. A similar cell as in Example 1 was assembled, and electrolysis was performed under the same conditions as in Example 1. As a result, the cathode overvoltage was 200 mV.

Comparative Example 3

An electrode was prepared in the same manner as in Example 3 with the exception that a mixed layer of ruthenium (80 mol %) and cerium (20 mol %) was used as the catalytic layer. A similar cell as in Example 1 was assembled, and electrolysis was performed under the same conditions as in Example 1. As a result, the cathode overvoltage was 110 mV. After the electrolysis was performed for 10 days while suspending the electrolysis for 1 hour per day, the cathode overvoltage increased to 150 mV. After the electrolysis for 30 days, the cell was disassembled, and the electrode was analyzed. As a result, cerium decreased by 15% from the initial amount. Further, iron deposition was observed.

TABLE 1

| | Composition Ratio (mol %) | Overvoltage | After Electrolysis for 10 Days | Consumption | Deposit |
|---|---|---|---|---|---|
| Example 1 | X = 50, y = 30, z = 20 | 90 mV | 90 mV | Not observed | Not observed |
| Example 2 | X = 50, y = 20, z = 30 | 85 mV | 85 mV | Not observed | Not observed |
| Example 3 | X = 60, y = 35, z = 5 | 85 mV | 85 mV | Not observed | Not observed |
| Example 4 | X = 50, y = 5, z = 45 | 90 mV | 90 mV | Not observed | Not observed |
| Example 5 | X = 50, y = 49, z = 1 | 90 mV | 90 mV | Not observed | Not observed |
| Example 6 | X = 50, y = 35, z = 15 | 90 mV | 90 mV | Not observed | Not observed |
| Example 7 | X = 60, y = 20, z = 10, Ru = 10 | 85 mV | 85 mV | Not observed | Not observed |
| Comparative Example 1 | X = 50, y = 50, z = 0 | 90 mV | 90 mV | 20% Decrease | Not observed |
| Comparative Example 2 | X = 40, y = 30, z = 30 | 200 mV | — | — | — |
| Comparative Example 3 | X = 0, y = 20, z = 0, Ru = 80 | 110 mV | 150 mV | 15% Decrease | Iron deposition |

The composition ratios of the catalytic layers and the electrolysis results in Examples 1 to 7 and Comparative Examples 1 to 3 are shown in Table 1. In Comparative Examples, consumption of the catalysts was observed, performance deterioration due to iron was observed, or the overvoltage was high. Compared with this, the cathodes of Examples were excellent in all characteristics.

While the present invention has been described in detail and with reference to specific embodiments thereof, it will be apparent to one skilled in the art that various changes and modifications can be made therein without departing from the spirit and scope thereof.

This application is based on Japanese Patent Application No. 2008-057968 filed Mar. 7, 2008, and the contents thereof are herein incorporated by reference.

What is claimed is:

1. A cathode for hydrogen generation comprising a cathode substrate having provided thereon a catalytic layer, wherein the catalytic layer contains at least three components of platinum, cerium and lanthanum in amounts of 50 to 98 mol %, 1 to 49 mol % and 1 to 49 mol %, respectively, in the form of metal, metal oxide or metal hydroxide.

2. The cathode for hydrogen generation according to claim 1, wherein the catalytic layer further comprises a platinum-group metal other than platinum in an amount of 1 to 49 mol % in the form of metal, metal oxide or metal hydroxide.

3. The cathode according to claim 1 or 2, which further comprises an intermediate layer containing a conductive oxide between the cathode substrate and the catalytic layer.

4. The cathode according to claim 3, wherein the intermediate layer comprises an oxide containing at least one of nickel and titanium.

* * * * *